United States Patent
Stewart

[11] Patent Number: 5,804,799
[45] Date of Patent: Sep. 8, 1998

[54] SNOW AND ICE MELTING SYSTEM

[76] Inventor: Pamela E. Stewart, 1095 N. Commerce Ter., Lecanto, Fla. 34461

[21] Appl. No.: 753,205

[22] Filed: Nov. 21, 1996

[51] Int. Cl.[6] ..................................................... H05B 3/34
[52] U.S. Cl. ........................ 219/528; 219/385; 219/202; 219/544
[58] Field of Search .................................. 219/385–387, 219/202, 544

[56] References Cited

U.S. PATENT DOCUMENTS

| | | | |
|---|---|---|---|
| 3,855,451 | 12/1974 | Lee | 219/386 |
| 4,091,355 | 5/1978 | Beck | 338/286 |
| 4,717,812 | 1/1988 | Makita | 219/528 |

*Primary Examiner*—Teresa J. Walberg
*Assistant Examiner*—Quan Nguyen

[57] ABSTRACT

A snow and ice melting system including a foldable heating cover dimensioned for covering a vehicle. A storage cart is dimensioned for receiving the heating cover in a folded configuration. A pair of cooperating cords are disposed within the storage cart. The pair of cooperating cords are in electrical communication with each other. The pair of cooperating cords include a first cord and a second cord. The first cord has a free end coupled with the heating cover. The second cord has a free end couplable with an electrical outlet.

1 Claim, 3 Drawing Sheets

SNOW AND ICE MELTING SYSTEM

BACKGROUND OF THE INVENTION

1. Field of the Invention

The present invention relates to a snow and ice melting system and more particularly pertains to eliminating a need to brush and scrape snow and ice from vehicles and preventing dangerous snow and ice build-up on roofs with a snow and ice melting system.

2. Description of the Prior Art

The use of automobile covers is known in the prior art. More specifically, automobile covers heretofore devised and utilized for the purpose of covering and protecting automobiles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,867,216 to McKee discloses a sun and snow vehicle cover.

U.S. Pat. No. 5,410,127 to LaRue et al. discloses an electric blanket system with reduced electromagnetic field.

U.S. Pat. No. Des. 344,203 to McElrath disclose the ornamental design for an electric blanket having separate top and bottom controls.

U.S. Pat. No. 4,858,985 to Wojcik discloses a vehicle cover protector-"VCP".

U.S. Pat. No. 4,940,276 to Madison discloses a car cover.

U.S. Pat. No. 4,659,905 to Gabrosek et al. discloses an electric blanket.

While these devices fulfill their respective, particular objective and requirements, the aforementioned patents do not describe a snow and ice melting system for eliminating a need to brush and scrape snow and ice from vehicles and preventing dangerous snow and ice build-up on roofs.

In this respect, the snow and ice melting system according to the present invention substantially departs from the conventional concepts and designs of the prior art, and in doing so provides an apparatus primarily developed for the purpose of eliminating a need to brush and scrape snow and ice from vehicles and preventing dangerous snow and ice build-up on roofs.

Therefore, it can be appreciated that there exists a continuing need for new and improved snow and ice melting system which can be used for eliminating a need to brush and scrape snow and ice from vehicles and preventing dangerous snow and ice build-up on roofs. In this regard, the present invention substantially fulfills this need.

SUMMARY OF THE INVENTION

In the view of the foregoing disadvantages inherent in the known types of automobile covers now present in the prior art, the present invention provides an improved snow and ice melting system. As such, the general purpose of the present invention, which will be described subsequently in greater detail, is to provide a new and improved snow and ice melting system and method which has all the advantages of the prior art and none of the disadvantages.

To attain this, the present invention essentially comprises a foldable heating cover comprised of an exterior layer and an interior layer. The exterior layer is fabricated of nylon. The interior layer is fabricated of plastic. The heating cover is dimensioned for covering an automobile. The heating cover includes a plurality of interconnected heating coils disposed within the interior layer. The heating coils have a plug receptacle extending outwardly of the heating cover. The system includes a storage cart having a generally rectangular configuration. The cart has an open top, a closed bottom and opposed front, rear and side walls together forming an interior storage compartment. The open top has a lid hingedly secured thereto. The closed bottom has wheels disposed on corners thereof. The front wall has a pivoting U-shape handle secured thereto. The storage compartment has a dividing wall disposed therein dividing the storage compartment into a large compartment and a small compartment. The large compartment is dimensioned for receiving the heating cover in a folded configuration. A pair of cooperating cords are disposed within the small compartment of the storage cart. The pair of cooperating cords are in electrical communication with each other. The pair of cooperating cords include a first cord and a second cord. The first cord has a free end coupled with the plug receptacle of the heating cover. The second cord has a free end couplable with an electrical outlet. A control assembly is disposed within the front wall of the storage cart. The control assembly is in communication with the pair of cooperating cords for adjustment of temperature of the heating cover.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved snow and ice melting system which has all the advantages of the prior art automobile covers and none of the disadvantages.

It is another object of the present invention to provide a new and improved snow and ice melting system which may be easily and efficiently manufactured and marketed.

It is a further object of the present invention to provide a new and improved snow and ice melting system which is of durable and reliable construction.

An even further object of the present invention is to provide a new and improved snow and ice melting system which is susceptible of a low cost of manufacture with regard to both materials and labor, and which accordingly is then susceptible of low prices of sale to the consuming public, thereby making such a snow and ice melting system economically available to the buying public.

Still yet another object of the present invention is to provide a new and improved snow and ice melting system which provides in the apparatuses and methods of the prior art some of the advantages thereof, while simultaneously overcoming some of the disadvantages normally associated therewith.

Even still another object of the present invention is to provide a new and improved snow and ice melting system for eliminating a need to brush and scrape snow and ice from vehicles and preventing dangerous snow and ice build-up on roofs.

Lastly, it is an object of the present invention to provide a new and improved snow and ice melting system including a foldable heating cover dimensioned for covering a vehicle. A storage cart is dimensioned for receiving the heating cover in a folded configuration. A pair of cooperating cords are disposed within the storage cart. The pair of cooperating cords are in electrical communication with each other. The pair of cooperating cords include a first cord and a second cord. The first cord has a free end coupled with the heating cover. The second cord has a free end couplable with an electrical outlet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
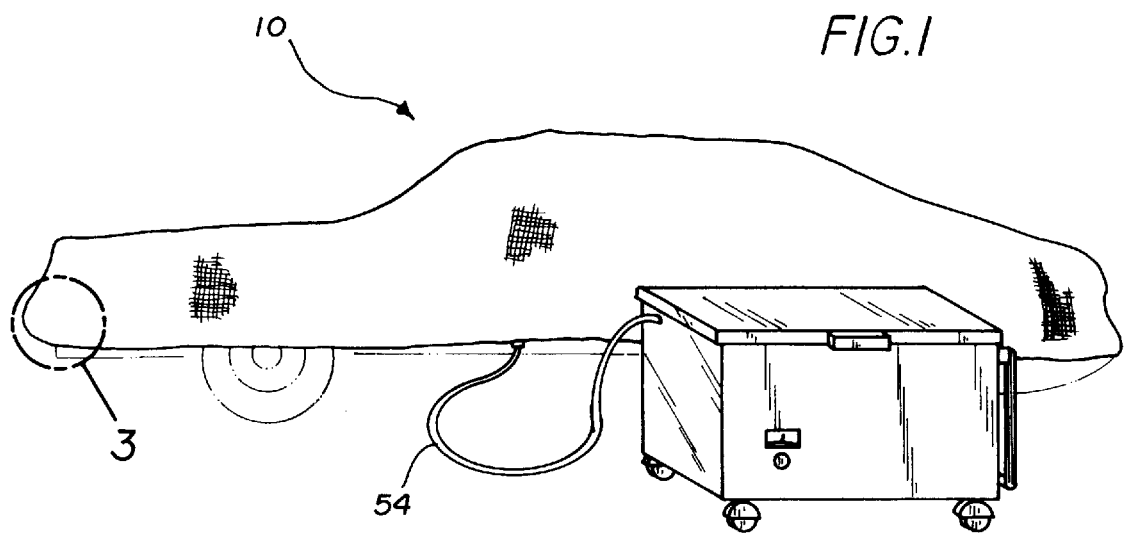
FIG. 1 is a perspective view of the preferred embodiment of the snow and ice melting system constructed in accordance with the principles of the present invention.
Figure 2:
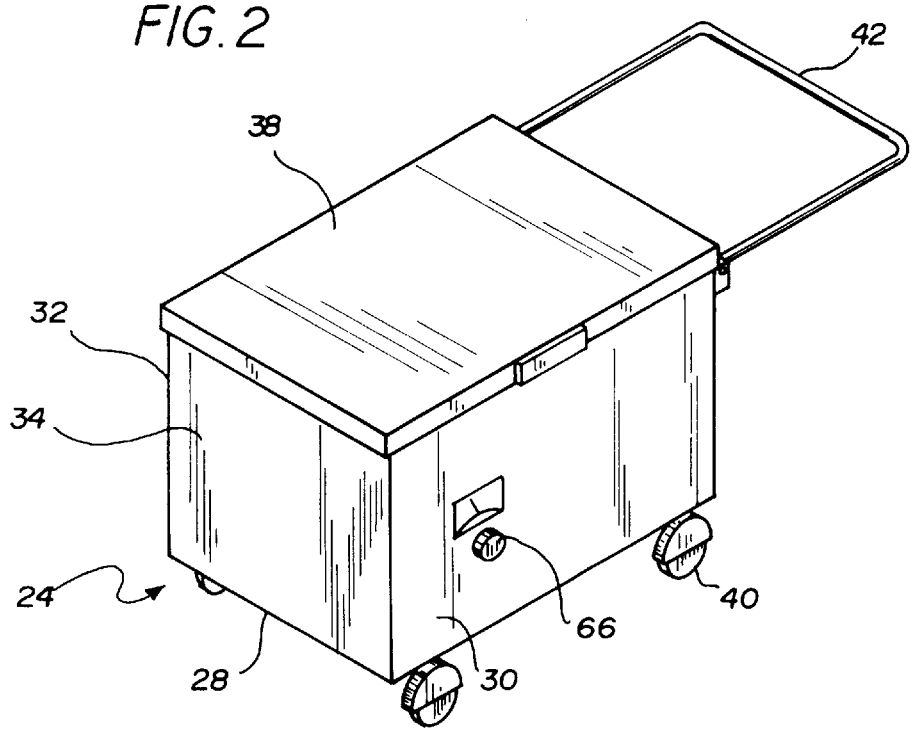
FIG. 2 is a perspective view of the cart of the present invention.
Figure 3:
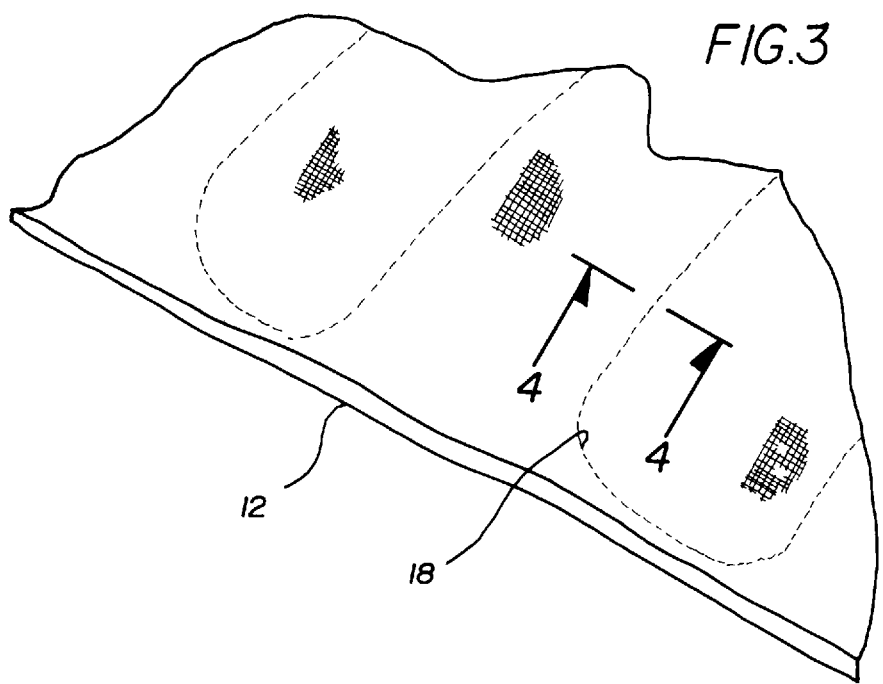
FIG. 3 is a sectional view of the cover as taken from circle 3 of FIG. 1.
Figure 4:
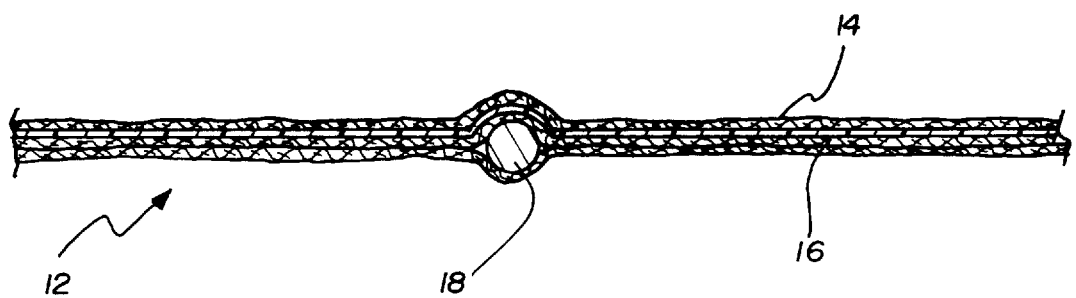
FIG. 4 is a cross-sectional view as taken along line 4—4 of FIG. 3.
Figure 5:
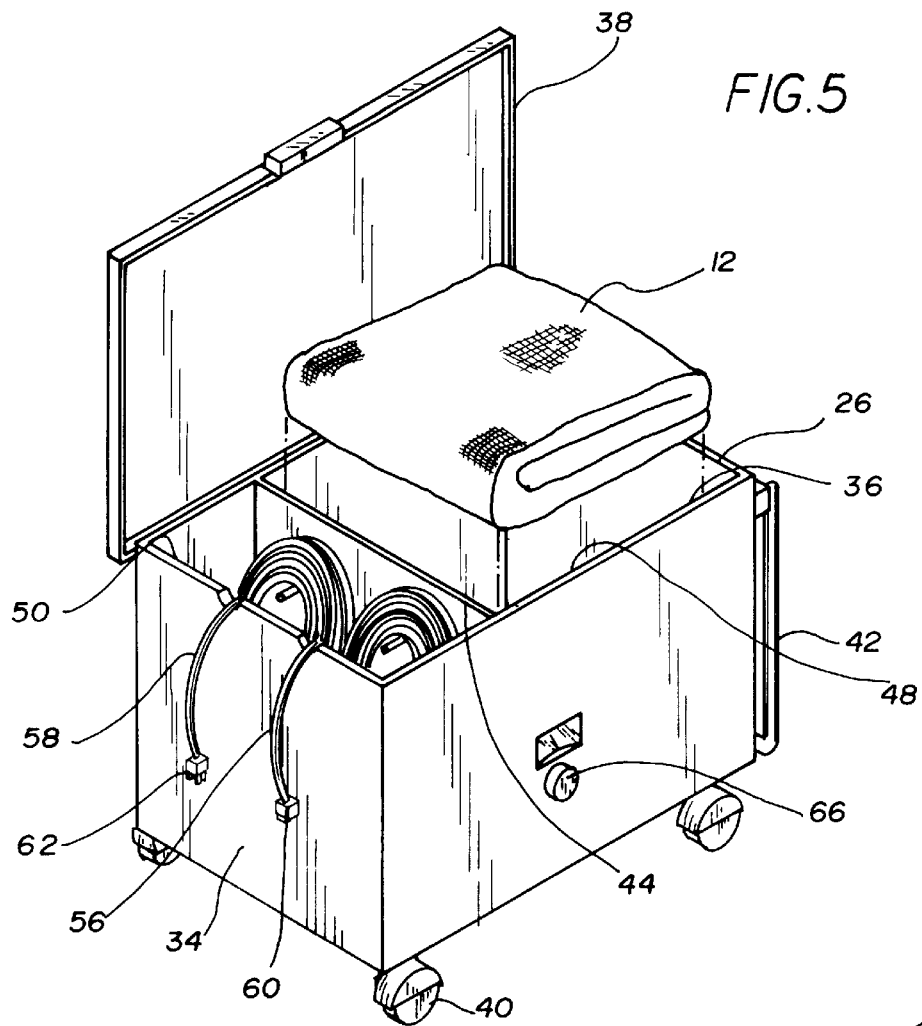
FIG. 5 is a perspective view of the cart illustrating its storage capabilities.
Figure 6:
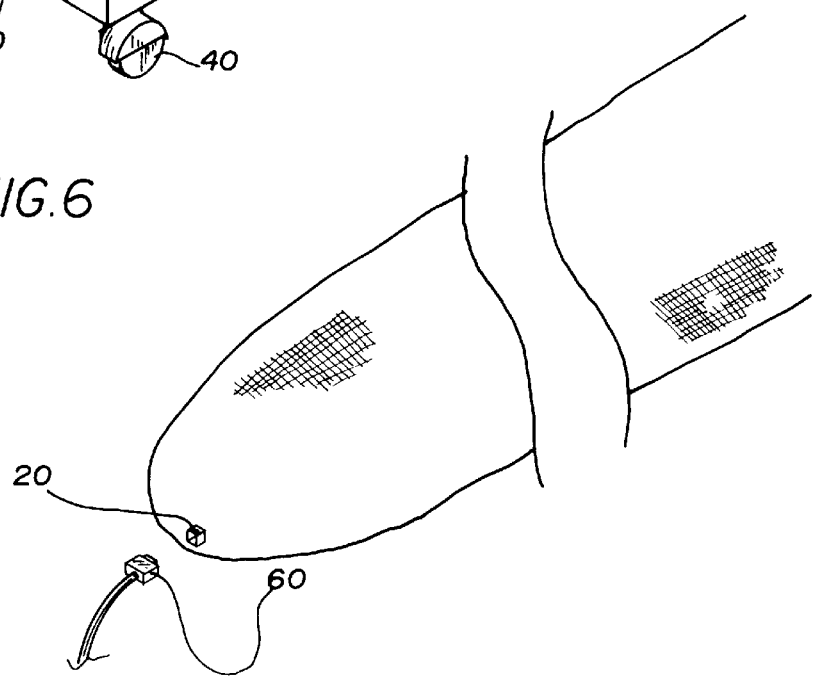
FIG. 6 is a perspective view of the cover illustrated coupled with an airplane wing.

With reference now to the drawings, and in particular, to FIGS. 1–6 thereof, the preferred embodiment of the new and improved snow and ice melting system embodying the principles and concepts of the present invention and generally designated by the reference number 10 will be described.

Specifically, it will be noted in the various Figures that the device relates to a new and improved snow and ice melting system for eliminating a need to brush and scrape snow and ice from vehicles and preventing dangerous snow and ice build-up on roofs. In its broadest context, the device consists of a foldable heating cover, a storage cart, a pair of cooperating cords and a control assembly. Such components are individually configured and correlated with respect to each other so as to attain the desired objective.

The system 10 is a specially designed snow and ice melter that will eliminate the need to brush and scrape snow and ice from vehicles, and can be used to prevent dangerous snow and ice build-up on roofs.

The system 10 features a "heating blanket" comprised of heating elements enclosed in an exterior of flexible waterproof material. This "blanket" would measure approximately twenty-two feet long by sixteen feet wide. Alternately, the blanket can be made into any size to accommodate any application.

The storage cart of the system 10 carries the blanket as well as a control panel with micro-controller/microprocessor and a thermostatic control assembly. This allows the user to control the temperature of the thermal grid to a desired heat setting. It will automatically shut off at 160 degrees F. The system 10 is powered from any standard 110–120 V AC power supply.

Compartments are provided in the cart for storage of the "heating blanket", power cords, and control assemblies. A pull handle allows easy pulling, and folds down when not in use for compact storage.

A cable and lock assembly could also be included with the system 10 so that the user can lock it to the vehicle to prevent theft.

The system 10 could also be used on airplane wings or other components that require the melting of snow and ice. The other applications could include walkways and steps and home roofs.

The system 10 includes a foldable heating cover 12 comprised of an exterior layer 14 and an interior layer 16. The exterior layer 14 is preferably fabricated of nylon. The interior layer 16 is fabricated of plastic or other suitable waterproof material. The nylon exterior layer 14 protects the exterior of the vehicle. The plastic interior layer 16 protects the heating elements disposed therein. The heating cover 12 is dimensioned for covering an automobile. Note FIG. 1. The heating cover 12 includes a plurality of interconnected heating coils 18 disposed within the interior layer 16. The heating coils 18 have a plug receptacle 20 extending outwardly of the heating cover 12.

The system 10 includes a storage cart 24 having a generally rectangular configuration. Note FIGS. 2 and 5. The cart 24 has an open top 26, a closed bottom 28 and opposed front 30, rear 32 and side walls 34 together forming an interior storage compartment 36. The open top 26 has a lid 38 hingedly secured thereto. The closed bottom 28 has wheels 40 disposed on corners thereof. The side wall 34 has a pivoting U-shape handle 42 secured thereto. The storage compartment 36 has a dividing wall 44 disposed therein dividing the storage compartment 36 into a large compartment 48 and a small compartment 50. The large compartment 48 is dimensioned for receiving the heating cover 12 in a folded configuration.

A pair of cooperating cords 54 are disposed within the small compartment 50 of the storage cart 24. The pair of cooperating cords 54 are in electrical communication with each other. The pair of cooperating cords 54 include a first cord 56 and a second cord 58. The first cord 56 has a free end 58 coupled with the plug receptacle 20 of the heating cover 12. The second cord 58 has a free end 62 couplable with an electrical outlet.

A control assembly 66 is disposed within the front wall 30 of the storage cart 24. The control assembly 66 is in communication with the pair of cooperating cords 54 for adjustment of temperature of the heating cover 12. The control assembly 66 includes a gauge and an adjustment knob.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A snow and ice melting system for eliminating a need to brush and scrape snow and ice from vehicles and preventing dangerous snow and ice build-up on roofs comprising, in combination:

a foldable heating cover comprised of an exterior layer and an interior layer, the exterior layer being fabricated of nylon, the interior layer being fabricated of plastic, the nylon exterior layer protects the vehicle, the heating cover dimensioned for covering an automobile, the heating cover including a plurality of interconnected heating coils disposed within the interior layer, the plastic interior layer protects the heating element disposed therein, the heating coils having a plug receptacle extending outwardly of the heating cover;

a storage cart having a generally rectangular configuration, the cart having an open top, a closed bottom and opposed front, rear and side walls together forming an interior storage compartment, the open top having a lid hingedly secured thereto, the closed bottom having wheels disposed on corners thereof, the side wall having a pivoting U-shaped handle secured thereto, the storage compartment having a dividing wall disposed therein dividing the storage compartment into a large compartment and a small compartment, the large compartment dismensioned for receiving the heating cover in a folded configuration;

a pair of cooperating cords disposed within the small compartment of the storage cart, the pair of cooperating cords being in electrical communication with each other, the pair of cooperating cords including a first cord and a second cord, the first cord having a free end coupled with the plug receptacle of the heating cover, the second cord having a free end coupleable with an electrical outlet; and a control assembly disposed within the front wall of the storage cart, the control assembly in communication with the pair of cooperating cords for adjustment of temperature of the heating cover.

* * * * *